United States Patent [19]

Ulam

[11] 3,952,938

[45] Apr. 27, 1976

[54] METHOD OF MAKING MULTIPLE MEMBER COMPOSITE METAL PRODUCTS

[75] Inventor: John B. Ulam, McMurray, Pa.

[73] Assignee: Clad Metals, Inc., Cannonsburg, Pa.

[22] Filed: Dec. 10, 1973

[21] Appl. No.: 423,253

[52] U.S. Cl. ............................ 228/190; 228/237
[51] Int. Cl.² .................. B23K 19/00; B23K 21/00
[58] Field of Search............ 29/497.5, 472.3, 471.1, 29/487, 196.2, 196.3; 220/63 R, 64; 228/185, 190, 237

[56] References Cited
UNITED STATES PATENTS

| | | | |
|---|---|---|---|
| 3,112,185 | 11/1963 | Ochsner et al. | 29/196.2 X |
| 3,143,241 | 8/1964 | Howell | 220/64 |
| 3,173,202 | 6/1961 | Farber | 29/498 |
| 3,269,004 | 8/1966 | Smith et al. | 29/472.3 |
| 3,352,005 | 11/1967 | Avellone | 29/497.5 X |
| 3,381,364 | 5/1968 | Winter | 29/497.5 X |
| 3,481,023 | 12/1969 | Jost et al. | 29/472.3 |
| 3,490,126 | 1/1970 | Miller | 29/196.3 |
| 3,589,873 | 6/1971 | Poth | 29/196.2 X |
| 3,606,672 | 9/1971 | Terai et al. | 29/497.5 |

Primary Examiner—Ronald J. Shore
Assistant Examiner—Carl Rowold
Attorney, Agent, or Firm—Buell, Blenko, & Ziesenheim

[57] ABSTRACT

A method of forming a composite metal product is provided, wherein the product so formed consists of a core having at least one layer each of copper and of aluminum and at least one outer cladding layer of stainless steel.

7 Claims, No Drawings

METHOD OF MAKING MULTIPLE MEMBER COMPOSITE METAL PRODUCTS

This invention relates to a method of forming multiple member composite metal products and in particular a copper core aluminum and stainless steel clad product.

The use of laminated or composite metal products of three laminates or less is well recognized in the industry. For example, stainless steel utensils with a copper bottom layer are well known, as are also aluminum cored or clad stainless steels and stainless clad steels. These products have all been available for some time past and have been extensively used for production of cook ware. One of the perennial problems with these prior art materials was and is an inability to get quick and even heat transfer over the entire pan area. These prior art materials are generally far superior to single layer metals but still far from perfect.

The present invention provides a new composite metal product based upon a copper clad aluminum or a copper core between two layers of aluminum either of which are clad with one or more layers of stainless steel. This new product overcomes the basic problems of the prior art materials discussed above. It will more rapidly and evenly distribute heat. It eliminates the problem of unsightly oxidation of copper in the prior art copper clad stainless steel utensils. It provides for superior heat distribution as compared with prior art stainless steel clad aluminum. It elminates the problem of oxidation discoloration while obtaining the unique combination of the thermal properties of both aluminum and copper.

Preferably I provide a copper cored aluminum clad with stainless steel on both sides, however the invention broadly includes copper clad aluminum or a copper core between two layers of aluminum either of which are clad with stainless on one or both sides. The core may be copper coated on one or both sides with aluminum. The aluminum must be substantially pure aluminum, such as 1100, 1230 or 1145 or it can be any one of these pure aluminum grades clad to one or both sides of 3003, 3004, or an aluminum alloy, such as Type 3003 aluminum coated with a layer of substantially pure aluminum such as Type 1100 aluminum. All members of the composite must be cleaned and conditioned on their surfaces by abrasive grinding to remove all oxides, brought together prior to heating, heated to a temperature of about 300° to 800°F reduced 20 to 50% in one pass or alternatively reduced up to about 5% in one roll stand followed by a reduction of 10% to 25% in a second roll stand, and then reheated at 700°F to permit diffusion to occur between the adjacent layers of metal. This diffusion operation causes an increase in bond strength between the three dissimilar metals and a certain amount of stress relieving. The resulting product is readily deep drawn into cooking vessels.

Alternatively the product may be made by forming a pre-composite core of aluminum and copper and there applying the stainless cladding layers to the aluminum surface or surfaces. In this practice the aluminum and copper sheets are abrasively cleaned and conditioned, brought together into contact, heated to 600° to 700°F and subjected to 30 to 70% reduction. The resulting compact is then abrasively cleaned on its surface and used as the core for a stainless steel cladding operation. In this step the assembly of core and stainless is heated to about 600° to 700°F, subjected preferably to a first reduction of about 2% and then subjected to a second reduction in the range of 5 to 25%. Alternatively the assembly may be reduced in a single reduction pass about 20 to 50%. The product is then heat treated at 700°F to cause annealing and diffusion as discussed above.

In a third alternative two sheets of aluminum are mechanically cleaned, heated to about 600° to 700°F, placed on opposite sides of a sheet of copper at room temperature and reduced by either the one or two step reductions discussed above. This core is then cleaned and placed between sheets of stainless, reduced and annealed.

This invention can perhaps be best understood by reference to the following examples of products and processes according to this invention.

EXAMPLE I

A sheet of copper having a thickness of 0.010 inch was abrasively cleaned with a wire brush and placed between two sheets of Type 1100 aluminum each 0.075 inch thick, and similarly abrasively cleaned. A sheet of Type 304 stainless steel, 0.010 inch thick which was abrasively cleaned was placed on each side of the aluminum sheets. The assembly was heated to 700°F and passed through a rolling mill to reduce the thickness to 0.130 inch. The resulting product was then reheated to 700°F for a sufficient time to produce diffusion between adjacent metal layers at their interfaces. The final annealed product was deep drawn into cooking vessels such as three quart saucepans and fry-pans.

EXAMPLE II

A sheet of 0.010 inch copper was abrasively cleaned and placed between two abrasively cleaned sheets of 0.080 inch Type 3003 aluminum. The assembly was heated to 450°F and passed through a rolling mill to a reduction of 20%. The resultant composite product was abrasively cleaned and a sheet of 0.010 inch stainless steel placed on each side. The assembly was heated to 700°F and given a first rolling pass at about 2% reduction and then rolled to 0.130 inch thickness in a final pass. The rolled product was then reheated to 700°F to permit diffusion between the metal layers to occur. The final product was cut into blanks and deep drawn into five quart Dutch ovens.

Where it is desired to have one surface of stainless steel and the other of aluminum, the same procedures outlined above are followed.

In the foregoing specification I have set out certain preferred embodiments and practices of my invention, it will be understood, however, that this invention may be otherwise embodied within the scope of the following claims.

I claim:

1. The method of making a composite metal product characterized by a high rate of thermal transmission and by resistance to corrosion comprising the steps of:
   a. mechanically cleaning the surfaces of each of a sheet from the group consisting of copper and copper alloys, a sheet from the group aluminum and aluminum alloys and a sheet of stainless steel;
   b. heating said mechanically cleaned sheets to a temperature of about 600° to 800°F;
   c. joining said sheets under pressure sufficient to reduce the total thickness of said sheets an amount between 25 to 60% with the aluminum sheet disposed between the copper and stainless steel; and d. stress relieving the joined sheets to a temperature of about 700°F, to cause diffusion between the metal sheets.

2. The method as claimed in claim 1 wherein the sheets are joined by passing through a rolling mill.

3. The method as claimed in claim 1 wherein the copper and aluminum sheets are first heated to a temperature betwen 300° to 600°F and joined under pressure sufficient to provide a reduction of 20 to 60%, the exposed surfaces mechanically cleaned and the pre-bonded core joined with the stainless steel under pressure sufficient to produce a first reduction of about 2% followed by a reduction of about 5 to 25%.

4. The method as claimed in claim 1 wherein the sheets being joined consist of a central copper sheet, an aluminum sheet on each side of the copper sheet and a stainless steel sheet on each side of each aluminum sheet.

5. A method as claimed in claim 1 wherein the sheets are heated to about 700°F and joined by rolling to a reduction of about 50%.

6. A method as claimed in claim 1 wherein the copper and aluminum sheets are first heated to a temperature between 300° to 600°F and joined under pressure sufficient to provide a reduction of 20 to 60%, the exposed surfaces mechanically cleaned and the pre-bonded core joined with the stainless steel under sufficient pressure to produce a reduction of about 20 to 50% in a single pass.

7. The method of making a composite metal product characterized by a high rate of thermal transmission and by resistance to corrosion comprising the steps of:

a. mechanically cleaning the aluminum surfaces of an aluminum clad copper sheet formed by diffusion bonding a sheet of copper and at least one sheet of aluminum, and the surface of a stainless steel sheet to be bonded thereto;

b. heating said mechanically cleaned sheets to a temperature of about 600° to 800°F;

c. joining said sheets under pressure sufficient to reduce the total thickness of said sheets an amount between 25 to 60% with the cleaned aluminum and stainless steel surfaces abutting; and d. stress relieving the joined sheets to a temperature of about 700°F to cause diffusion between the metal sheets.

* * * * *